United States Patent
Suzuki

[11] Patent Number: 6,002,123
[45] Date of Patent: Dec. 14, 1999

[54] DRIVING METHOD FOR SOLID-STATE IMAGING DEVICE PROVIDED WITH BLOOMING PREVENTION STRUCTURE

[75] Inventor: Ryoji Suzuki, Kanagawa, Japan

[73] Assignee: Sony Corporation, Tokyo, Japan

[21] Appl. No.: 09/033,605

[22] Filed: Mar. 3, 1998

[30] Foreign Application Priority Data

Mar. 4, 1997 [JP] Japan .................................. 9-048978

[51] Int. Cl.$^6$ .................................................. H01L 27/00
[52] U.S. Cl. ...................... 250/208.1; 348/294; 257/292
[58] Field of Search ........................... 250/208.1, 214.1, 250/214 R; 348/294, 297, 298, 300–303, 308, 311, 312; 358/482, 483; 257/443, 444, 290–292

[56] References Cited

U.S. PATENT DOCUMENTS

5,841,126  11/1998  Fossum et al. ...................... 250/208.1
5,898,168   4/1999  Gowda et al. ......................... 348/311
5,900,623   5/1999  Tsang et al. ......................... 250/208.1

*Primary Examiner*—Stephone Allen
*Attorney, Agent, or Firm*—Hill & Simpson

[57] ABSTRACT

The invention provides a driving method suitable for a solid-state imaging device provided with a blooming prevention structure by which the dynamic range of the solid-state imaging device can be varied suitably. Each pixel section of a solid-state imaging device includes a reset gate for controlling a resetting operation for discharging accumulated charge from a charge accumulation portion of the pixel section. By performing reset gate voltage driving so that the voltage to be applied to the reset gate may vary midway in a charge accumulation period of the pixel section, the overflow level can be raised midway in the charge accumulation period of the pixel section to expand the dynamic range. Or, the voltage to be applied to a transfer gate for controlling a transferring operation of forwarding accumulated charge from a charge accumulation portion into a floating diffusion portion or the voltage to be applied to a bias gate for controlling the potential of a floating gate is varied.

6 Claims, 6 Drawing Sheets

DRIVING METHOD FOR SOLID-STATE IMAGING DEVICE PROVIDED WITH BLOOMING PREVENTION STRUCTURE

BACKGROUND OF THE INVENTION

This invention relates to a driving method for a solid-state imaging device provided with a blooming prevention structure.

In solid-state imaging devices which are used widely such as CCD type solid-state imaging devices and MOS type solid-state imaging devices, each pixel photoelectrically converts incident light into charge and accumulates the charge, and then the accumulated charge is read out as signal charge.

A solid-state imaging device of the type mentioned is normally provided with a blooming prevention structure. Blooming is a phenomenon wherein, when strong light is irradiated upon a certain pixel and a large amount of charge is generated in the pixel, the charge overflows from the pixel and enters pixels around the pixel thereby to cause an image at a high light location to look in an expanded condition.

The blooming prevention structure is a structure which causes charge generated by photoelectric conversion by each pixel section to overflow so that the accumulated charge of the pixel section may remain at an overflow level which is a given maximum accumulation charge amount to prevent occurrence of blooming.

However, if the maximum accumulated charge amount is determined in this manner, then the dynamic range is limited by it. Consequently, if a large amount of light which causes charge which exceeds the overflow level to be generated is inputted to some pixel sections, then all of the levels of output signals of the pixel sections exhibit an equal value, resulting in loss of light amount information.

In order to moderate this problem, a method has been proposed wherein the overflow level is varied from a low level to a high level midway in a charge accumulation period of each pixel so that the light amount to output signal characteristic may have a KNEE characteristic.

A MOS type solid state imaging device to which the method just described is applied is disclosed in Japanese Patent Publication Application No. 4-32589, wherein a MOS type solid state imaging device provided with a longitudinal overflow drain structure is constructed such that the overflow level is raised by varying the potential of a p-well with respect to an n-type substrate.

However, with the method just described, since the overflow level rises simultaneously at all pixels of a same solid-state imaging device, the start and end timings of charge accumulation must be adjusted among all of the pixels, and use of a lens shutter is essentially required.

The fact that the start and end timings of charge accumulation must be adjusted among all pixels signifies that the sensitivity drops because it is not possible to perform, while reading out of signals from a certain line is proceeding, charge accumulation in another line. Further, the fact that a lens shutter is essentially required narrows applications of the solid-state imaging device.

SUMMARY OF THE INVENTION

It is an object of the present invention to provide a driving method for a solid-state imaging device provided with a blooming prevention structure wherein an overflow level of each pixel section can be varied suitably only by controlling an application voltage to a gate of the pixel section which is provided initially for reading out of signal charge such as a reset gate, a transfer gate or a bias gate.

It is another object of the present invention to provide a driving method for a solid-state imaging device provided with a blooming prevention structure which does not require adjustment of start and end timings of charge accumulation among all pixels and does not require use of a lens shutter.

In order to solve the objects described above, according to an aspect of the present invention, there is provided a driving method for a solid-state imaging device provided with a blooming prevention structure for causing charge generated by photoelectric conversion of each pixel section to overflow, comprising the single step of performing reset gate voltage driving so that a voltage to be applied to a reset gate of the pixel section for controlling a resetting operation for discharging accumulated charge from a charge accumulation portion of the pixel section is varied midway in a charge accumulation period of the pixel section to vary an overflow level of the pixel section in the charge accumulation period of the pixel section to vary a dynamic range of the solid-state imaging device midway.

According to another aspect of the present invention, there is provided a driving method for a solid-state imaging device provided with a blooming prevention structure for causing charge generated by photoelectric conversion of each pixel section to overflow, comprising the single step of performing transfer gate voltage driving so that a voltage to be applied to a transfer gate of the pixel section for controlling a transfer operation for transferring accumulated charge from a charge accumulation portion to a floating diffusion portion of the pixel section is varied midway in a charge accumulation period of the pixel section to vary an overflow level midway in the charge accumulation period of the pixel section to vary a dynamic range of the solid-state imaging device midway.

According to a further aspect of the present invention, there is provided a driving method for a solid-state imaging device provided with a blooming prevention structure for causing charge generated by photoelectric conversion of each pixel section to overflow, comprising the single step of performing bias gate voltage driving so that a voltage to be applied to a bias gate of the pixel section is varied midway in a charge accumulation period of the pixel section to vary an overflow level of the pixel section midway in the charge accumulation period of the pixel section to vary a dynamic range of the solid-state imaging device.

According to the present invention, the overflow level of each pixel section can be varied suitably only by controlling the application voltage to a gate of the pixel section which is provided initially for reading out of signal charge such as a reset gate, a transfer gate or a bias gate. In particular, with the driving methods of the invention described above, gate voltage driving is performed such that the voltage to be applied to a gate such as a reset gate, a transfer gate or a bias gate of each pixel section is varied midway in a charge accumulation period of the pixel section to vary the overflow level midway in the charge accumulation period of the pixel section to vary the dynamic range of the solid-state imaging device.

Consequently, the overflow level can be varied suitably only by controlling the application voltage to a gate which is provided initially for reading out of signal charge such as a reset gate, a transfer gate or a bias gate.

Further, since the start and end timings of charge accumulation need not be adjusted among all of the pixels, a drop of the sensitivity of the solid-state imaging device does not occur. Furthermore, since a lens shutter need not be used, the solid-state imaging device is free from restrictions to applications which may otherwise be caused by such lens shutter. Besides, the present invention can be applied not only to still pictures but also to moving pictures.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENTS

Figure 1:
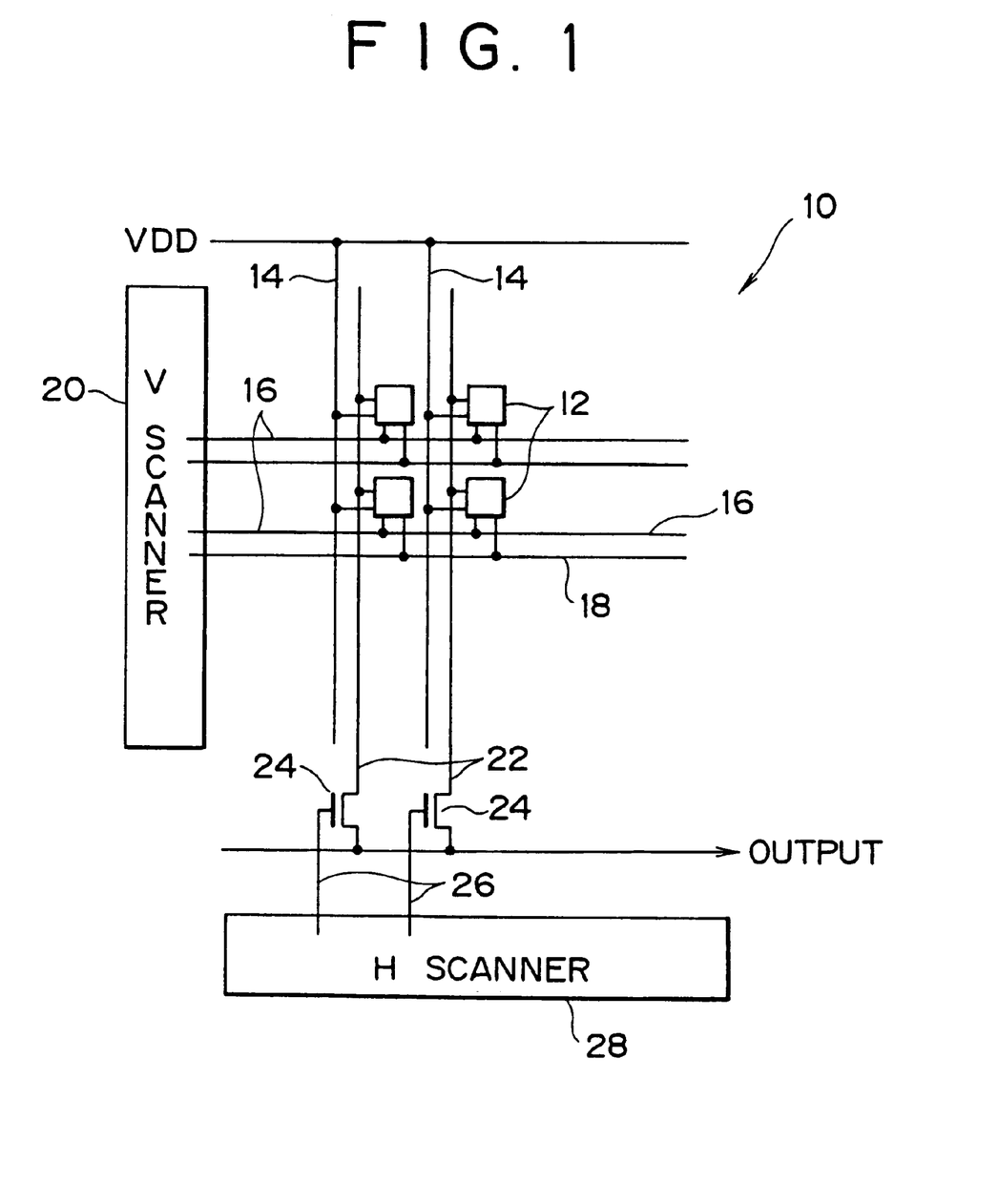
FIG. 1 is a circuit diagram of a solid-state imaging device to which a method according to a first embodiment of the present invention is applied.

Referring first to FIG. 1, there is shown a solid-state imaging device to which a method according to a first embodiment of the present invention is applied. The solid-state imaging device shown is generally denoted at 10 and is formed as a MOS type imaging device provided with a horizontal blooming prevention structure having a reset gate.

The solid-state imaging device 10 includes a large number of pixel sections 12 formed in an array on a substrate, and peripheral circuits connected to the pixel sections 12.

The peripheral circuits include power supply lines 14 connected to all of the pixel sections 12, reset lines 16 and vertical selection lines 18 each connected to those of the pixel sections 12 which are included in one line, a vertical scanning register (V scanner) 20 for driving the reset lines 16 and the vertical selection lines 18 at predetermined timings, signal lines 22 individually connected to those of the pixel sections 12 which are positioned at same horizontal positions of all of the lines, output transistors 24 connected to the individual signal lines 22, horizontal selection lines 26 connected to the gates of the individual output transistors 24, and a horizontal scanning register (H scanner) 28 for driving the horizontal selection lines 26 at predetermined timings.

Figure 2:
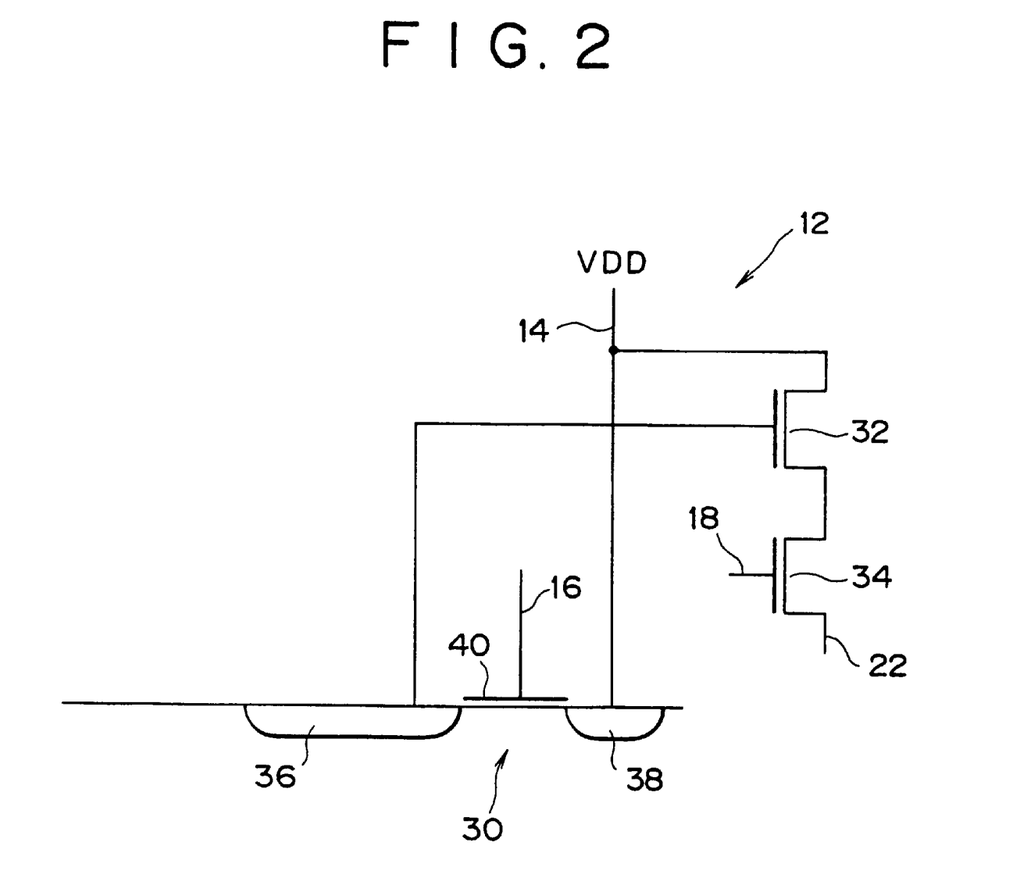
FIG. 2 is a circuit diagram of a pixel section of the solid-state imaging device of FIG. 1.

Referring to FIG. 2, there is shown a circuit construction of each of the pixel sections 12 of the solid-state imaging device 10 described above. The pixel section 12 shown has a pixel structure of an AMI (Amplified MOS Intelligent Imager) type and includes three n-channel MOS transistors 30, 32 and 34 formed in a p-region. Of the three n-channel MOS transistors 30, 32 and 34, the first transistor 30 has a source 36 formed as a junction type photodiode (charge accumulation portion).

More particularly, the first transistor 30 is composed of a source 36 in the form of a photodiode, a drain 38 connected to a power supply voltage VDD, and a gate 40 connected to a reset line 16.

The second transistor 32 is a driving transistor while and the third transistor 34 is a selecting transistor, and the transistors 32 and 34 are connected in series at the source-drains thereof between a power supply line 14 and a signal line 22. The gate of the second transistor 32 is connected to the source 36 of the first transistor 30, and the gate of the third transistor 34 is connected to a vertical selection line 18.

The source 36 of the first transistor 30 in the form of a photodiode photoelectrically converts incident light into charge and accumulates the charge. The gate 40 of the first transistor 30 functions as a reset gate and the drain 38 functions as a reset drain, and if a predetermined reset voltage is applied to the gate 40, then charge accumulated in the source 36 is discharged to the drain 38, whereupon the pixel section 12 is reset.

A maximum accumulation charge amount which can be accumulated in the source 36 depends upon a voltage applied to the gate 40 during a charge accumulation period. Since charge which exceeds the maximum accumulation charge amount overflows from the source 36 and is discharged to the drain 38, the maximum accumulation charge amount is called overflow level.

By setting the overflow level to a level with which there is no possibility that charge may leak out from the source 36 and enter pixel sections around the pixel section, occurrence of blooming is prevented.

The solid-state imaging device 10 expands its dynamic range by raising the overflow level from a low level to a high level midway in a charge accumulation period of each pixel section 12, and this is described with reference to FIGS. 3 and 4.

Figure 3:
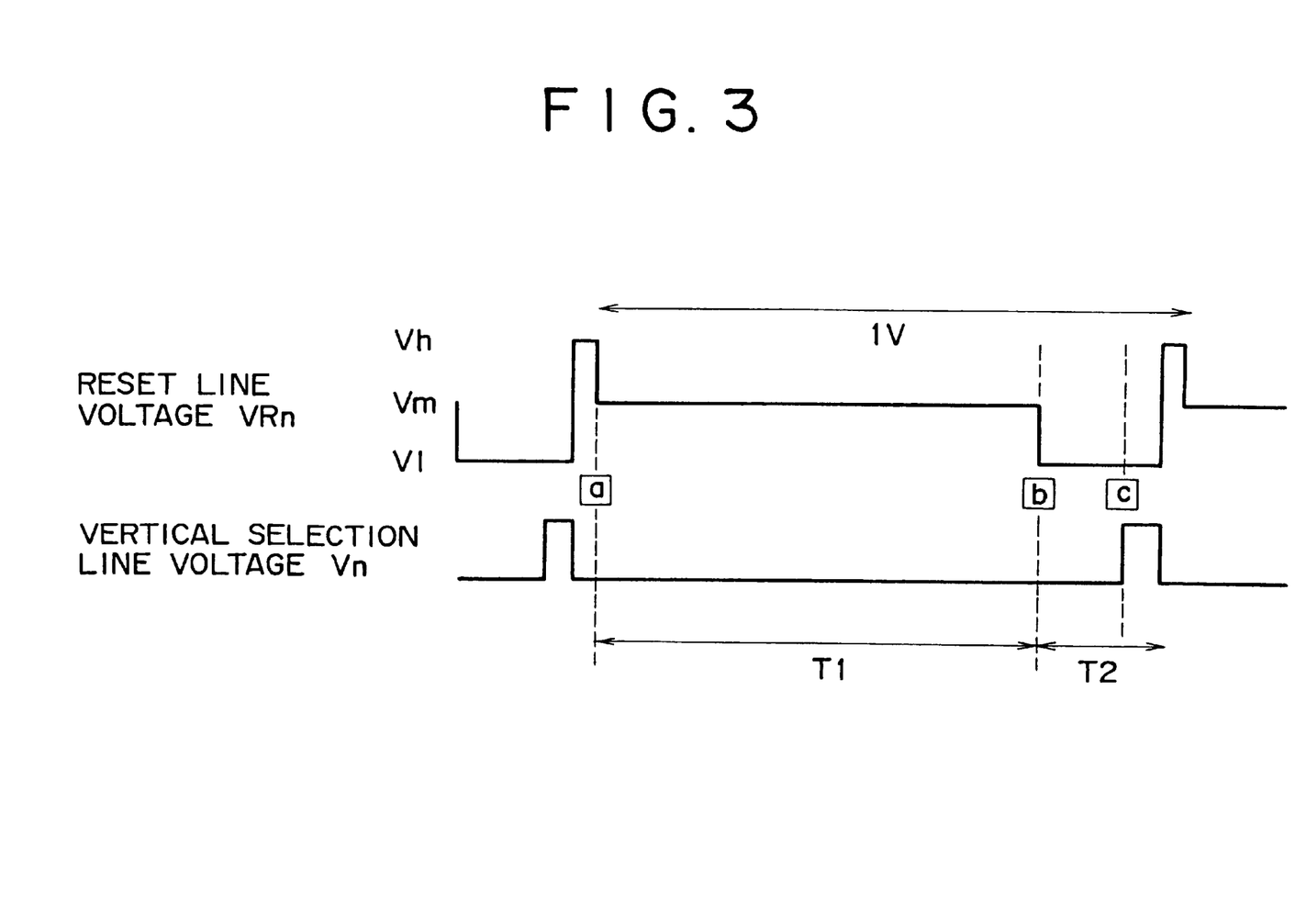
FIG. 3 is a timing chart illustrating driving timings of a reset line and a vertical selection line of the pixel section of FIG. 2.
Figure 4:
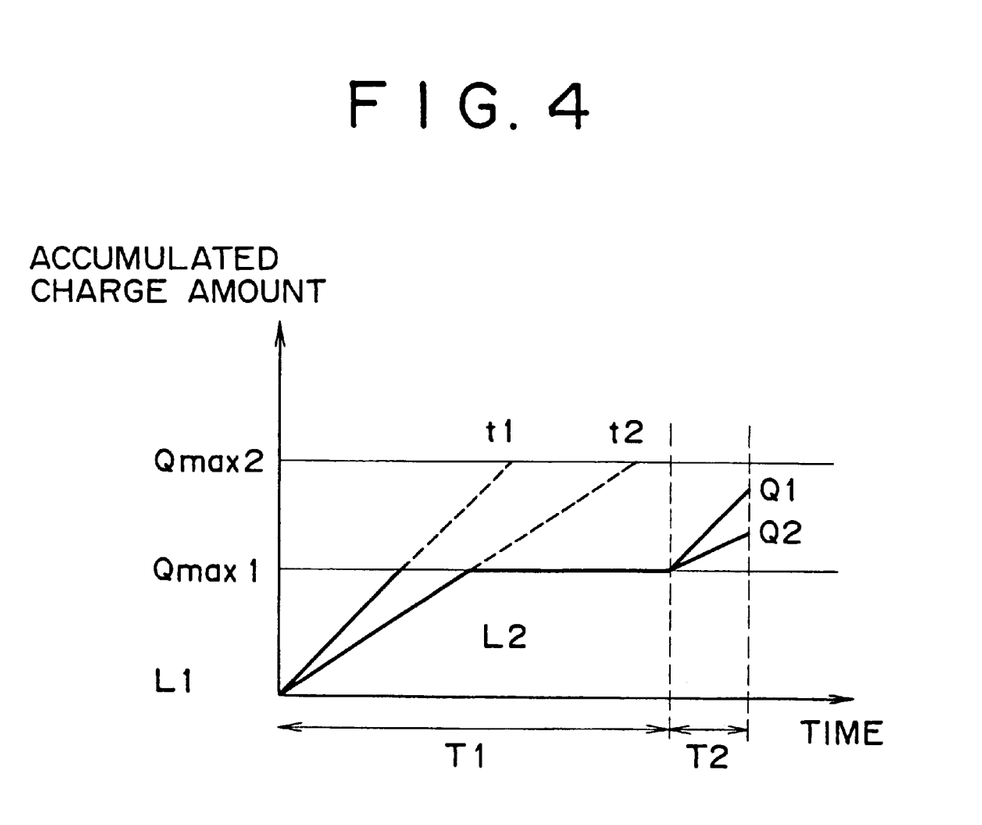
FIG. 4 is a graph illustrating a characteristic of a time to accumulated charge amount of the pixel section of FIG. 2.

FIG. 3 illustrating driving timings of the voltage VRn of a reset line 16 and the voltage Vn of a vertical selection line 18, and FIG. 4 illustrates a characteristic of a time to accumulated charge amount of each pixel section.

The voltage Vn of the vertical selection line 18 is driven with two values, and while this voltage Vn is at the high level, signal charge of those pixel sections 12 in the nth line is successively read out. Meanwhile, the voltage VRn of the reset line 16 is driven with three values, that is, three levels of Vh, Vm and Vl in order from the higher side of the voltage level. The two signals periodically vary for each one operation cycle (1 V) of the solid-state imaging device 10.

At time a of FIG. 3, the voltage VRn changes from Vh to Vm, and accumulation of charge generated by photoelectric conversion of the source (photodiode) 36 of the first transistor 30 begins. In this instance, the maximum accumulation charge amount (overflow level) which can be accumulated in a pixel is Qmax1 (FIG. 4) which corresponds to the voltage level Vm.

During a period T1 from time a to time b, charge generated by photoelectric conversion is gradually accumulated in the source 36. In any pixel section with which the charge amount generated by photoelectric conversion exceeds Qmax1 within the period, excessive charge is abandoned through the reset gate 40 to the reset drain 38 (accordingly to the power supply voltage VDD) and the accumulated charge amount is saturated at Qmax1.

At time b, the voltage VRn changes from Vm to Vl, whereupon the overflow level increases from Qmax1 to Qmax2 (FIG. 4), and in any pixel section which has been saturated at Qmax1, accumulation of charge generated by photoelectric conversion is resumed.

During another period T2 from time b to time c, charge generated by photoelectric conversion is gradually accumulated in the source 36. In any pixel section with which the charge amount generated by photoelectric conversion exceeds Qmax2 within this period, excessive charge is abandoned through the reset gate 40 to the reset drain 38 (accordingly to the power supply voltage VDD), and the accumulated charge amount is saturated at Qmax2.

At time c, a pulse of the voltage Vn rises and the third (selecting) transistor 34 is turned on, and output signals corresponding to the accumulated charge amounts are outputted through the signal line 22.

Expansion of the dynamic range obtained by the operation described above is described with reference to the graph of FIG. 4.

Where the overflow level is set to Qmax2 from the first without raising it midway in a charge accumulation period, if a large amount of light is inputted to a pixel section and the accumulated charge amount gradually increases as indicated by a straight line L1 or L2 in FIG. 4, then it varies as it is along a broken line and is saturated at time t1 or t2. Accordingly, the light amounts corresponding to L1 and L2 cannot be distinguished with the output levels of the solid-state imaging device 10.

In contrast, where the overflow level is raised from the low level Qmax1 to the high level Qmax2 midway in a charge accumulation period, then the straight lines L1 and L2 become polygonal lines which exhibit angles at the level Qmax1 as seen in FIG. 4 and at time b3 as seen in FIG. 3, and the accumulated charge amounts at an outputting point of time become Q1 and Q2 and their light amounts can be distinguished with the output levels. In other words, the dynamic range of the solid-state imaging device 10 is expanded.

Subsequently, how the method of the present invention described above is superior to the method disclosed in Japanese Patent Publication Application No. Heisei 4-32589 mentioned hereinabove is described with reference to the timing chart of FIG. 5.

Figure 5:
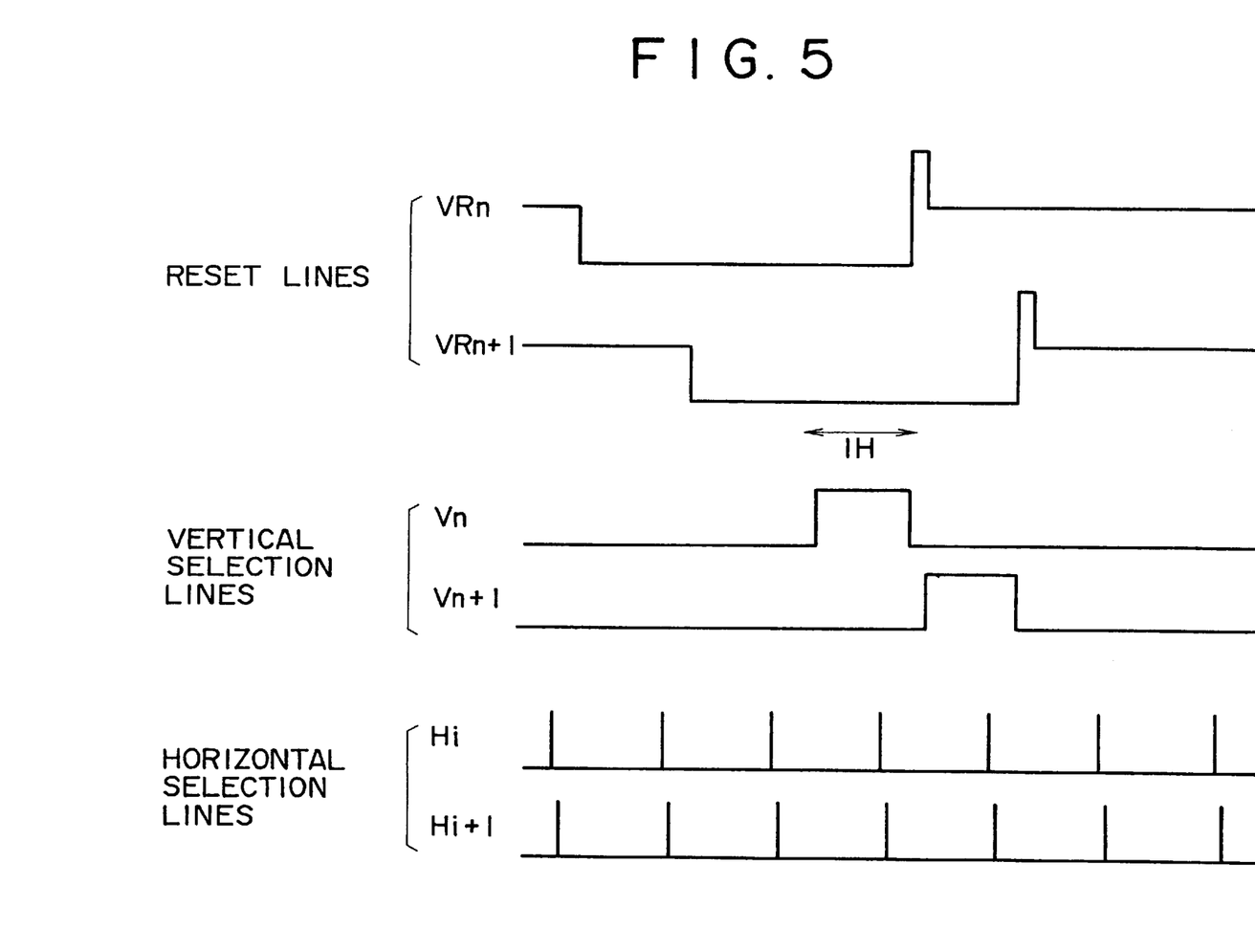
FIG. 5 is a timing chart illustrating driving timings of reset lines, vertical selection lines and horizontal selection lines shown in FIG. 1.

Illustrated in FIG. 5 are the voltage VRn of the nth reset line 16, the voltage VRn+1 of the n+1th reset line 16, the voltage Vn of the nth vertical selection line 18, the voltage Vn+1 of the n+1th vertical selection line 18, the voltage Hi of a horizontal selection line 26 corresponding to the ith pixel of each line, and the voltage Hi+1 of a horizontal selection line 26 corresponding to the i+1th pixel of each line.

If the voltage Hi changes to the high level while the voltage Vn remains at the high level (1H), then reading out from the ith pixel of the nth line is performed. As can be seen apparently from FIG. 5, when reading out from a particular line is proceeding, the other lines are accumulating charge. Such parallel operations are impossible with the method of Japanese Patent Publication Application No. Heisei 4-32589, and since the charge accumulation period in an operation cycle of a given length can be made longer by the parallel operations, the sensitivity of the solid-state imaging device can be made higher.

Further, needless to say, also that no lens shutter is required is one of advantages of the method of the present invention when compared with the method of Japanese Patent Publication Application No. Heisei 4-32589.

With the embodiment described above, each of the pixel sections 12 includes a reset gate 40 for controlling a resetting operation of discharging accumulated charge from the charge accumulation portion of the pixel section, and by performing reset gate voltage driving so that the voltage VR to be applied to the reset gate 40 of each of the pixel sections 12 may vary from Vm to Vl midway in a charge accumulation period of the pixel section 12, the overflow level is raised from the low level Qmax1 to the high level Qmax2.

In particular, the voltage to be applied to the reset gate 40 of each pixel section 12 is driven among three values of the first voltage Vh for causing the pixel section to perform a resetting operation, the second voltage Vm for setting the overflow level of the pixel section to a level lower than a level for prevention of blooming and the third voltage Vl for setting the overflow level of the pixel section to the level for prevention of blooming such that, upon starting of a charge accumulation period of the pixel section 12, the first voltage Vh is applied, and immediately after that, the second Vm voltage is applied, Thereafter, midway in the charge accumulation period, the third voltage Vl is applied.

Consequently, by setting the ratio between the period T1 within which the level of the second voltage Vm and/or the overflow level are kept at the low level Qmax1 and the period T2 within which the level of the second voltage Vm and/or the overflow level are kept at the high level Qmax2 in accordance with an object of imaging, a dynamic range suitable for the imaging object can be secured.

Now, a second embodiment of the present invention is described with reference to FIG. 6.

Figure 6:
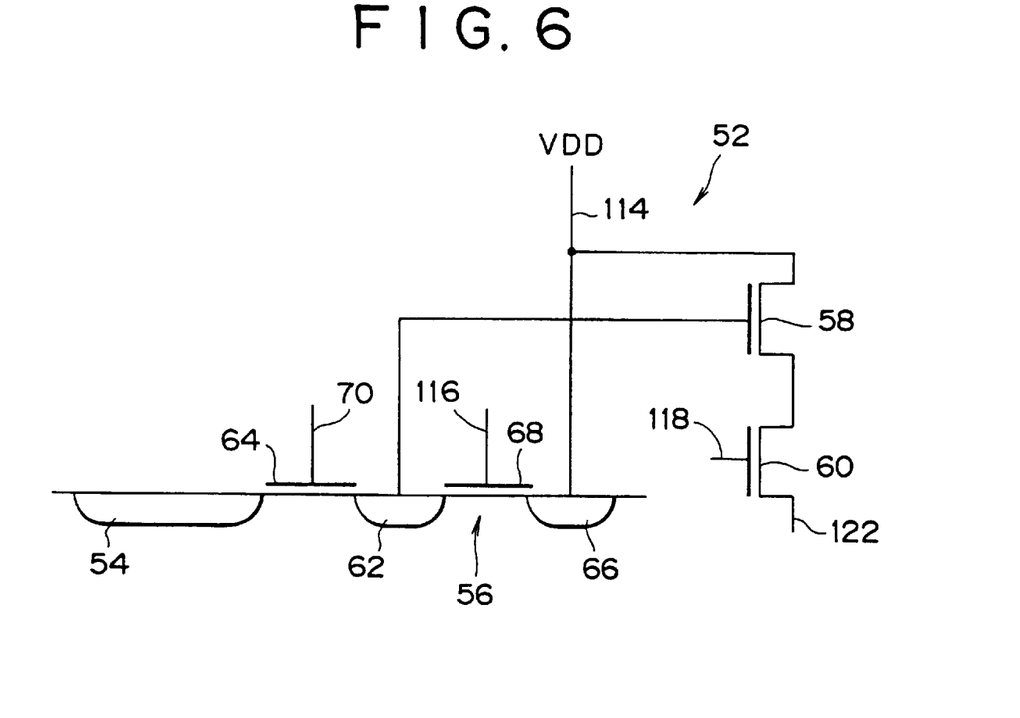
FIG. 6 is a circuit diagram of a pixel section of a solid-state imaging device to which a method according to a second embodiment of the present invention is applied.

FIG. 6 is a circuit diagram of a pixel section 52 of a solid-state imaging device to which a method according to a second embodiment of the present invention is applied.

The pixel section 52 has a reading out structure of the floating diffusion type and includes a single junction type photodiode 54 and three n-channel MOS transistors 56, 58 and 60 formed in a p-region of a substrate. A source 62 of the first transistor 56 from among the three n-channel MOS transistors 56, 58 and 60 is formed as a floating diffusion portion into which accumulated charge of the photodiode (charge accumulation portion) 54 is transferred through a channel below a transfer gate 64.

More particularly, the first transistor 56 is composed of a source 62 in the form of a floating diffusion portion, a drain 66 connected to a power supply voltage VDD and a gate or reset gate 68 connected to a reset line 116.

The second transistor 58 is a driving transistor and the third transistor 60 is a selecting transistor, and the two transistors 58 and 60 are connected in series at the source-drains thereof between a power supply line 114 and a signal line 122. The gate of the second transistor 58 is connected to the source 62 of the first transistor 56, and the gate of the third transistor 60 is connected to a vertical selection line 118. The transfer gate 64 is connected to a transfer control line 70.

Within a charge accumulation period, the photodiode 54 photoelectrically converts incident light into charge and accumulates the charge. A maximum accumulation charge amount which can be accumulated in the photodiode 54 depends upon a voltage applied to the transfer gate 64 during the charge accumulation period. If charge which exceeds the maximum accumulation charge amount is generated, then excessive charge overflows from the photodiode 54 and flows out to the floating diffusion portion, that is, the source 62 of the first transistor 56. Further, since, during a charge accumulation period, the barrier level of the reset gate 68 is controlled so that it may not become higher than the barrier level of the transfer gate 64, if the amount of the charge which flows out from the photodiode 54 to the floating diffusion portion 62 is large, then the charge is further discharged from there to the drain 66 through the channel below the reset gate 68.

Upon reading out of signal charge, the reset gate 68 is turned on immediately prior to the reading out, and consequently, the charge of the floating diffusion portion 62 is all discharged to the drain. Then, when the reset gate 68 is turned off and the transfer gate 62 is turned on, the accumulated charge flows out, that is, is forwarded, from the photodiode 54 to the floating diffusion portion 62. Then, a resulting potential variation of the floating diffusion portion 62 is read out as a signal through the second transistor 58.

In the construction described above, the overflow level of the pixel section 52 depends upon the voltage applied to the transfer gate 64 during a charge accumulation period. Therefore, in the method according to the second embodiment of the present invention, by performing transfer gate voltage driving so that the voltage to be applied to the transfer gate 64 is varied midway in a charge accumulation period of the pixel section 52, the overflow level is raised from a low level to a high level midway in the charge accumulation period.

More particularly, transfer gate voltage driving is performed such that the voltage to be applied to the transfer gate 62 of each pixel section 52 is driven among three values of a first voltage for causing the pixel section to perform a transfer operation, a second voltage for setting the overflow level of the pixel section to a level lower than a level for prevention of blooming and a third voltage for setting the overflow level of the pixel section to the level for prevention of blooming such that, upon starting of a charge accumulation period of the pixel section, the first voltage is applied, and immediately after that, the second voltage is applied, Thereafter, midway in the charge accumulation period, the third voltage is applied.

Also by the present transfer gate driving, similar advantages as those by the first embodiment described above can be obtained.

Subsequently, a third embodiment of the present invention is described with reference to FIG. 7.

Figure 7:
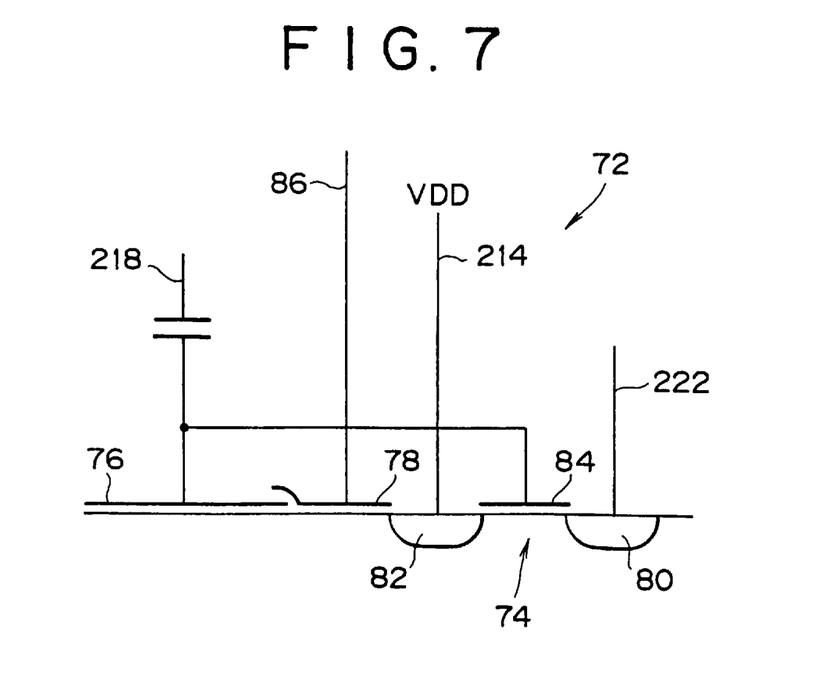
FIG. 7 is a circuit diagram of a pixel section of a solid-state imaging device to which a method according to a third embodiment of the present invention is applied.

FIG. 7 is a circuit diagram of a pixel section 72 of a solid-state imaging device to which a method according to a third embodiment of the present invention is applied.

The pixel section 72 has a reading out structure of the floating gate type and includes an n-channel MOS transistor 74, a photo-gate 76 (charge is accumulated in a potential well below this photo-gate 76), and a bias gate 78 (which functions as a barrier gate) formed in a p-region of a substrate.

The transistor 74 is connected at a source 80 thereof to a signal line 222, at a drain 82 thereof to a power supply line 214 and at a gate 84 thereof to the photo-gate 76.

The photo-gate 76 is further connected to a vertical selection line 218 through an electrostatic capacity, and the bias gate 78 is connected to a vertical bias line 86. Reading out of signal charge is performed through an output transistor (not shown) connected to the signal line 222.

Three operations of accumulation, reading out and resetting of the pixel section 72 are controlled by driving the voltage of the vertical selection line 218 among three values. In particular, when the voltage of the vertical selection line 218 is Vm, charge is accumulated in the potential well below the photo-gate 76, and if the voltage is raised to Vh, then the photo-gate 76 and the gate 84 of the transistor 74 connected to the photo-gate 76 enter a floating state, and the potential of the gate 84 then exhibits a potential corresponding to the accumulated charge. This potential is detected through the transistor 74. Further, if the voltage of the vertical selection line 218 is set to Vl lower than Vm, then the potential of the photo-gate 76 drops and the potential well below the photo-gate 76 becomes shallow until the bottom of the well comes to a height higher than the barrier level of the bias gate 78. Consequently, the charge accumulated in the potential well is all discharged to the drain 82 of the transistor 74, whereupon the pixel section 72 is reset.

In the construction described above, the maximum accumulation charge amount (accordingly the overflow level of the pixel section 72) which can be accumulated in the potential well below the photo-gate 76) depends upon the applied voltage to the bias gate 78, and charge exceeding the maximum accumulation charge amount is discharged to the drain 82 of the transistor 74 through the channel below the bias gate 78.

In the method according to the third embodiment of the present invention, by performing bias gate voltage driving so that the voltage to be applied to the bias gate 78 is varied midway in a charge accumulation period of the pixel section 72, the overflow level is raised from a low level to a high level midway in the charge accumulation period.

More particularly, bias gate voltage driving is performed such that the voltage to be applied to the bias gate 78 of each pixel section 72 is changed between two values of a first voltage for setting the overflow level of the pixel section to a level lower than a level for prevention of blooming and a second voltage for setting the overflow level of the pixel section to the level for prevention of blooming such that, upon starting of a charge accumulation period of the pixel section, the first voltage is applied, and midway in the charge accumulation period, the second voltage is applied.

Also by the present bias gate voltage driving, advantages similar to those of the first and second embodiments described above can be achieved.

It is to be noted that, while, in the embodiments described above, the overflow level is controlled between two stages of a low level and a high level by driving the voltage to be applied to the reset gate, the transfer gate or the bias gate among three values (except that to the bias gate which is driven between two values), also another method wherein the voltage to be applied to those gates is driven with four or more values (except for that to the bias gate which is driven among three or more values) to control the overflow level among three or more stages is available, and also a further method wherein the voltage to be applied to those gates is continuously varied to continuously raise the overflow level is available.

Having now fully described the invention, it will be apparent to one of ordinary skill in the art that many changes and modifications can be made thereto without departing from the spirit and scope of the invention as set forth herein.

What is claimed is:

1. A driving method for a solid-state imaging device provided with a blooming prevention structure for causing charge generated by photoelectric conversion of each pixel section to overflow, comprising the single step of:

performing reset gate voltage driving so that a voltage to be applied to a reset gate of the pixel section for controlling a resetting operation for discharging accumulated charge from a charge accumulation portion of the pixel section is varied midway in a charge accumulation period of the pixel section to vary an overflow level of the pixel section in the charge accumulation period of the pixel section to vary a dynamic range of the solid-state imaging device midway.

2. A driving method for a solid-state imaging device according to claim 1, wherein the reset gate voltage driving is performed such that the voltage to be applied to the reset gate of the pixel section is driven among three values of a first voltage for causing the pixel section to perform a resetting operation, a second voltage for setting the overflow level of the pixel section to a level lower than a level for prevention of blooming and a third voltage for setting the overflow level of the pixel section to the level for prevention of blooming such that, upon starting of a charge accumulation period of the pixel section, the first voltage is applied, and immediately after that, the second voltage is applied, whereafter, midway in the charge accumulation period, the third voltage is applied.

3. A driving method for a solid-state imaging device provided with a blooming prevention structure for causing charge generated by photoelectric conversion of each pixel section to overflow, comprising the single step of:

performing transfer gate voltage driving so that a voltage to be applied to a transfer gate of the pixel section for controlling a transfer operation for transferring accumulated charge from a charge accumulation portion to a floating diffusion portion of the pixel section is varied midway in a charge accumulation period of the pixel section to vary an overflow level midway in the charge accumulation period of the pixel section to vary a dynamic range of the solid-state imaging device midway.

4. A driving method for a solid-state imaging device according to claim 3, wherein the transfer gate voltage driving is performed such that the voltage to be applied to the transfer gate of the pixel section is driven among three values of a first voltage for causing the pixel section to perform a transfer operation, a second voltage for setting the overflow level of the pixel section to a level lower than a level for prevention of blooming and a third voltage for setting the overflow level of the pixel section to the level for prevention of blooming such that, upon starting of a charge accumulation period of the pixel section, the first voltage is applied, and immediately after that, the second voltage is applied, whereafter, midway in the charge accumulation period, the third voltage is applied.

5. A driving method for a solid-state imaging device provided with a blooming prevention structure for causing charge generated by photoelectric conversion of each pixel section to overflow, comprising the single step of:

performing bias gate voltage driving so that a voltage to be applied to a bias gate of the pixel section is varied midway in a charge accumulation period of the pixel section to vary an overflow level of the pixel section midway in the charge accumulation period of the pixel section to vary a dynamic range of the solid-state imaging device.

6. A driving method for a solid-state imaging device according to claim 5, wherein the bias gate voltage driving is performed such that the voltage to be applied to the bias gate of the pixel section is driven between two values of a first voltage for setting the overflow level of the pixel section to a level lower than a level for prevention of blooming and a second voltage for setting the overflow level of the pixel section to the level for prevention of blooming such that, upon starting of a charge accumulation period of the pixel section, the first voltage is applied, and midway in the charge accumulation period, the second voltage is applied.

* * * * *